W. W. SHEPHERD.
ATTACHMENT FOR HITCHING STRAPS.
APPLICATION FILED DEC. 30, 1911.

1,092,299.

Patented Apr. 7, 1914.

Inventor
William Weldon Shepherd

Witnesses
W. S. Bock
A. L. Phelps

By
C. C. Shepherd
Attorney

UNITED STATES PATENT OFFICE.

WILLIAM WELDON SHEPHERD, OF WILMINGTON, OHIO.

ATTACHMENT FOR HITCHING-STRAPS.

1,092,299.

Specification of Letters Patent. Patented Apr. 7, 1914.

Application filed December 30, 1911. Serial No. 668,636.

*To all whom it may concern:*

Be it known that I, WILLIAM WELDON SHEPHERD, a citizen of the United States, residing at Wilmington, in the county of Clinton and State of Ohio, have invented certain new and useful Improvements in Attachments for Hitching-Straps, of which the following is a specification.

My invention relates to attachments for hitching straps and is particularly designed to remedy an existing deficiency in the use of hitching straps which is frequently the source of considerable annoyance to persons using the same. This annoyance is most frequently found in the tying of hitching straps around a vertical pole. After any appreciable length of time, a hitching strap will have slid or dropped downwardly upon the pole. This results in numerous inconveniences such as the restraint of the horse's head in an uncomfortable position, probably inducing him to endeavor to break loose, or requiring the operator to stoop to an uncomfortable extent to release the hitching strap. The restraint of the horse's head mentioned has frequently been the cause of frightening the horse and resulted in the breaking of the strap and possibly a run-away.

My invention is particularly effective in conjunction with hitching straps applied to wooden poles and desirably takes the form of a gripping element of a form calculated to bite into the wood of the pole and thereby maintain the strap against vertical movement upon the pole. Furthermore, the preferred construction of my attachment renders it operable in a measure by any stress placed upon the strap. It is operable in the sense that, having once been placed in position, stress of the hitching strap only serves to more firmly embed the gripping element in the material of the pole.

The preferred embodiment of my invention is shown in the accompanying drawings, in which similar characters of reference designate corresponding parts, and in which—

Figure 1:
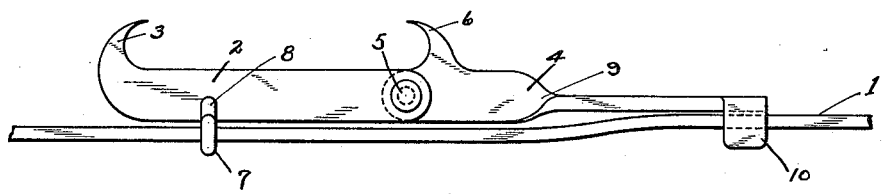
Figure 2:
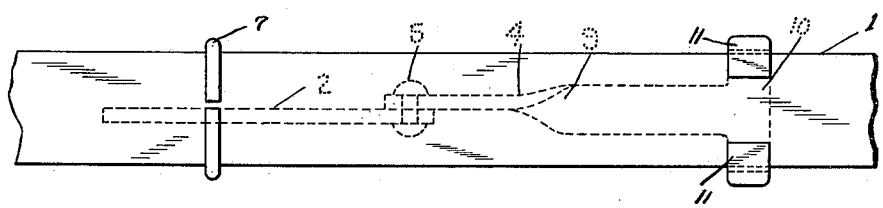
Figure 3:
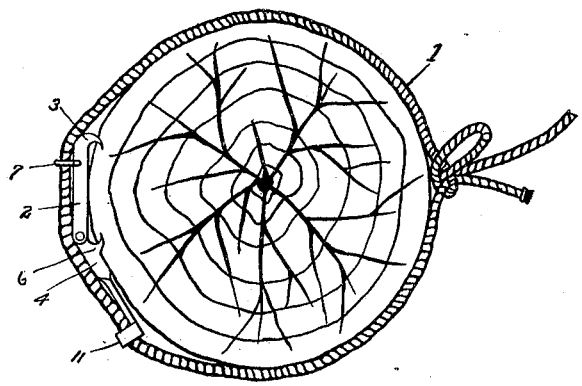

Figure 1 is a side elevation of my attachment shown in application to a section of strap, Fig. 2 is a bottom plan view of the structure shown in Fig. 1, and Fig. 3 is a transverse section of a pole embraced by a hitching rope and showing my attachment in operative relation to the pole and rope.

In the drawings, the strap or rope may be designated 1. Mounted upon the strap or rope, whichever may be utilized, is my attachment which is comparatively permanent in its nature and comprises a hook element 2 with a bent-over prong 3 upon one end and having a lever handle 4 pivoted thereto as at 5. The lever handle 4 carries a laterally and inwardly extending prong 6 which is formed for complemental action with the prong 3 upon the member 2. The member 2 is desirably secured in position upon the strap or rope by an embracing bail 7 having an offset U-shaped portion 8 serving as a means for pivotally supporting the member 2 and preventing lateral movement thereof or tilting. The lever handle 4 is preferably twisted as at 9 to have its shaft extending with its sides in parallelism to the strap and upon the free extremity of this lever handle there is carried a T-shaped head 10 with channel wings 11 of a suitable structure to embrace the strap or rope 1 and to serve as a guide therefor.

In application, it will be seen that the member 8 is readily placed in position upon the strap 1 by a suitable bending of its legs and the hitching strap is then placed in the desired position. When in its proper position, the lever handle is swung upon its fulcrum sufficiently to cause the prongs 3 and 6 to bite into the wood of the pole. The hitching strap is then tied in place and it is desirable that it should pass and lie between the wings 11, so that any stress applied to the hitching strap will only tend to move the lever handle upon its fulcrum and cause the prongs 3 and 6 to coöperatively embed themselves in the material of the pole with greater firmness.

It will thus be seen that I have provided an extremely simple device, readily applicable to a hitching strap or rope and capable of a ready securement in position, with the assurance that any pulling upon the strap or rope will only serve to more firmly embed the attachment in the material of the post.

What I claim, is—

1. An attachment for hitching straps comprising complemental prong carrying members pivotally connected together and mounted to lie lengthwise upon the strap whereby said elements automatically become effective to grip a pole when it is embraced by the strap.

2. An attachment for hitching straps comprising a prong carrying member, and a pronged lever pivotally carried thereby, said member and said lever being mounted to lie lengthwise upon the strap, the prong on said member being arranged to be complementally effective with the prong on said lever to grip a pole to which the strap is applied by inward movement of the end of said lever opposite said pivotal connection.

3. An attachment for hitching straps comprising a member carrying a prong at one end and being pivotally connected to a complemental lever element at its other end, said lever element carrying a complemental prong adjacent said pivotal connection, means carried by the free end of said lever for attachment to the strap body, and means carried by the pronged end of said member for attachment to the strap body.

In testimony whereof I affix my signature in presence of two witnesses.

WILLIAM WELDON SHEPHERD.

Witnesses:
C. A. HARRIS,
FRED DOAN.

Copies of this patent may be obtained for five cents each, by addressing the "Commissioner of Patents, Washington, D. C."